United States Patent
Naruse et al.

(10) Patent No.: US 8,247,473 B2
(45) Date of Patent: Aug. 21, 2012

(54) COLORANT DISPERSION OF RECORDING INK, AND RECORDING INK USING THE SAME

(75) Inventors: Mitsuru Naruse, Shizuoka (JP); Minoru Hakiri, Shizuoka (JP); Hiroyuki Fushimi, Shizuoka (JP); Shin Hasegawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 89 days.

(21) Appl. No.: 12/991,711

(22) PCT Filed: May 22, 2009

(86) PCT No.: PCT/JP2009/059833
§ 371 (c)(1),
(2), (4) Date: Nov. 9, 2010

(87) PCT Pub. No.: WO2009/145285
PCT Pub. Date: Dec. 3, 2009

(65) Prior Publication Data
US 2011/0071250 A1 Mar. 24, 2011

(30) Foreign Application Priority Data

May 27, 2008 (JP) ................... 2008-138437

(51) Int. Cl.
*C09D 11/10* (2006.01)
(52) U.S. Cl. ............... 523/160; 524/556; 524/558
(58) Field of Classification Search .......... 524/556, 524/558; 523/160
See application file for complete search history.

(56) References Cited

U.S. PATENT DOCUMENTS 5,736,606 A 4/1998 Yanagi et al.

FOREIGN PATENT DOCUMENTS

| JP | 8 283560 | 10/1996 |
| JP | 9 183926 | 7/1997 |
| JP | 2000 44861 | 2/2000 |
| JP | 2005 23284 | 1/2005 |
| JP | 2008 63500 | 3/2008 |
| JP | 2008 88253 | 4/2008 |
| JP | 2009 67830 | 4/2009 |

OTHER PUBLICATIONS

International Search Report issued Sep. 1, 2009 in PCT/JP09/59833 filed May 22, 2009.

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

The present invention provides a colorant dispersion for a recording ink containing at least a dispersant, a colorant, and water, wherein the dispersant is a polycarboxylic acid dispersant containing units represented by formulae (1) to (3): where R1, R2, and R4 are selected from a hydrogen atom and CH3; R3 is selected from a hydrogen atom and a C1-C3 alkyl group; R5 represents a C1-C3 alkyl group; AO and BO represent a C2-C3 oxyalkylene group; M is selected from alkali metal, alkali earth metal, ammonium, and organic amine; m represents an integer of 1 to 30; and n represents an integer of 5 to 50.

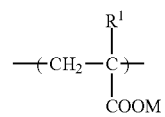

(1)

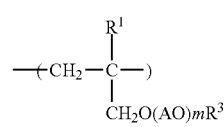

(2)

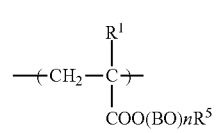

(3)

12 Claims, No Drawings

COLORANT DISPERSION OF RECORDING INK, AND RECORDING INK USING THE SAME

TECHNICAL FIELD

The present invention relates to a colorant dispersion for a recording ink for image forming purposes and so forth, in which a colorant is dispersed in a dispersion medium as fine particles in a stable state, as well as to a recording ink, ink cartridge, method for inkjet recording, and image formed matter using the colorant dispersion.

BACKGROUND ART

Colorant dispersions of recording ink are used in various applications that utilize their colorant properties, such as in writing inks for pens or seal inks, in image forming apparatuses using liquid inks (e.g. wet type printers or inkjet printers) and so forth.

It is important that in these colorant dispersions the colorant should be uniformly dispersed at an intended particle diameter and the liquid property should be kept constant with time.

Furthermore, since a colorant dispersion is less likely to be used alone but is often used in combination with a resin or other additives depending on the purpose, the colorant dispersion needs not only to keep the property itself excellent but also to have no influence on the properties of the other additives.

Particularly when the colorant dispersion is used in a recording ink, as well as degradation with time of the colorant dispersion itself in the ink liquid, thickening of the ink liquid due to interaction with the other additives and adverse effects on degradation with time of the ink liquid and on printed images because of the combined use of the colorant dispersion with the other additives such as a resin in the recording ink, arise, which necessitates very careful selection of a dispersant for dispersing a colorant.

The ink incorporating such a colorant dispersion of recording ink is applied or transferred onto a medium and dried to form a membrane or a recorded image.

Recently, demand for aqueous inks is increasing in view of an environmental and safety perspective.

However, recording performance of the aqueous ink is easily affected by a medium to be used, which is responsible for various problems concerning the membrane or the image. Particularly when paper is used for the medium instead of film, the problems are exaggerated.

When the aqueous ink is used for recording on paper, substantial time is required for drying, and a fair amount of the aqueous ink permeates the paper due to excellent compatibility with the paper, which, particularly in the case of using uncoated, relatively nonsmooth paper, results in a low color density of the image formed by the colorant a fair amount of which has been lost by permeation into the paper. The latter problem has not been seen in recording using a solvent ink or a solventless ink.

In order to increase the color density, it is necessary to increase the amount of the colorant in the ink, which, however, not only disadvantageously adds to the cost, but also results in aggregation or precipitation of the colorant and in turn in bad liquid stability of the ink liquid because the colorant density is increased in the solvent. In addition to these problems, increasing the amount of the colorant leads to a problem of bad appearance caused by roughening surfaces of the image and the membrane.

Recently, methods for inkjet recording have become widespread as image forming methods, because they have advantages in that they facilitate full-color printing in the simper process than other method for recording and they allow for obtaining high-resolution images with a simply structured apparatus.

In the inkjet recording methods, a small amount of an ink is flown by applying a pressure produced by heat and so forth to the ink, the flown ink is allowed to adhere to a medium for image forming such as paper, and the adhered ink needs to be dried promptly (to permeate the medium for image forming) to thereby form images. Therefore, drying property or an image density associated with the use of the aqueous ink may be getting more and more important in the inkjet recording method.

Particularly recently, the inkjet recording methods are further developed in the field of industry and business, which increases demand for faster output of high density images.

For example, in Patent Literature 1, for achieving excellent dispersion stability of an aqueous ink or a high density of printed images, a method of incorporating a polymer produced by copolymerizing (meth)acrylic acid with a monomer having a hydroxyl group, etc. is proposed, and as an example of the monomer having a hydroxyl group a polyethylene glycol allyl ether is described.

However, the proposed aqueous ink fails to provide an adequate image density and has a drawback that when a colorant having a large specific surface area such as carbon black is dispersed the dispersion stability of the aqueous ink becomes poor with time.

In Patent Literature 2, for increasing resistance of an ink to film-forming stress, an ink binder produced by copolymerizing an alkyl (meth)acrylate and a monomer having a nitrogen atom and a monomer having a hydrophilic group is proposed, and as examples of the hydrophilic monomer a hydroxypolyethyleneglycol mono(meth)acrylate dialkyleneglycol allyl ether and a monomer having an acrylic acid sulfonic acid group are described. However, this ink also fails to provide an adequate image density.

In Patent Literature 3, an ink containing a polymer produced by copolymerizing sodium acrylate and a polyethyleneglycolmonoacrylate is proposed. However, this ink also fails to produce an adequate image density.

Furthermore in Patent Literature 4, a solventless resin produced by copolymerizing a polyalkyleneglycolacrylate (80%-100%) with another monomer (0%-20%) is proposed. However, the solventless resin has low water-solubility, therefore is not suitable for use in a colorant dispersion containing water, and also has little effect on improvement of an image density produced.

Patent Literature 1: Japanese Patent Application Laid-Open (JP-A) No. 2005-23284
Patent Literature 2: JP-A No. 2000-44861
Patent Literature 3: JP-A No. 09-183926
Patent Literature 4: JP-A No. 08-283560

DISCLOSURE OF INVENTION

An object of the present invention is to provide a colorant dispersion for a recording ink which has excellent stability with time and is capable of providing a high image density, as well as recording ink, ink cartridge, method for inkjet recording, and image formed matter using the colorant dispersion for a recording ink.

As a result of earnest studies aiming to solve the above mentioned problems, the present inventors have found that when a dispersant having a particular structure is used in a colorant dispersion containing the dispersant, a colorant, and water, storage stability with time of the colorant dispersion and of a recording ink containing the colorant dispersion can be improved and an image density in the case of image forming with the recording ink can also be improved.

The present invention is based on the above findings by the inventors. The means for solving the above problems are as follows:

<1> A colorant dispersion for a recording ink containing at least a dispersant, a colorant, and water, wherein the dispersant is a polycarboxylic acid dispersant containing units represented by formulae (1) to (3):

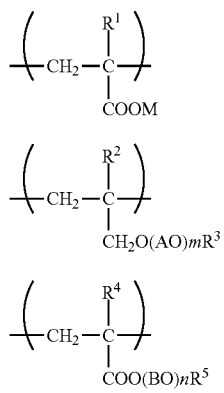

where $R^1$, $R^2$, and $R^4$ are selected from a hydrogen atom and $CH_3$; $R^3$ is selected from a hydrogen atom and a C1-C3 alkyl group; $R^5$ represents a C1-C3 alkyl group; AO and BO represent a C2-C3 oxyalkylene group; M is selected from alkali metal, alkali earth metal, ammonium, and organic amine; m represents an integer of 1 to 30; and n represents an integer of 5 to 50.

<2> The colorant dispersion for a recording ink according to the item <1>, wherein the polycarboxylic acid dispersant further contains a unit represented by formula (4):

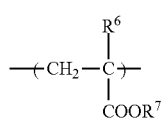

where $R^6$ is selected from a hydrogen atom and $CH_3$; and $R^7$ represents a C1-C3 alkyl group.

<3> The colorant dispersion for a recording ink according to any one of the items <1> and <2>, wherein the polycarboxylic acid dispersant further contains a unit represented by formula (5):

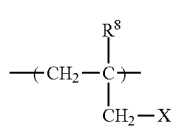

where $R^8$ is selected from a hydrogen atom and $CH_3$; and X is selected from formulae (5)-1 and (5)-2:

$$—SO_3M \quad (5)\text{-}1$$

where M is selected from alkali metal, alkali earth metal, ammonium, and organic amine;

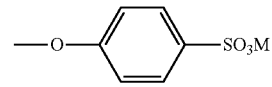

where M is selected from alkali metal, alkali earth metal, ammonium, and organic amine.

<4> The colorant dispersion for a recording ink according to any one of the items <1> to <3>, wherein the colorant is a carbon black.

<5> A recording ink containing at least the colorant dispersion for a recording ink according to any one of the items <1> to <4>.

<6> An ink cartridge containing at least the recording ink according to the item <5>, and a container configured to contain the recording ink.

<7> An inkjet recording method including at least applying a stimulus to the recording ink according to the item <5>, and ejecting the recording ink so as to record an image.

<8> An image formed matter including at least a recording medium, and an image formed with the recording ink according to the item <5> on the recording medium.

<9> An inkjet recording apparatus including at least an ink ejecting unit configured to apply a stimulus to the recording ink according to the item <5> and to eject the recording ink so as to record an image.

<10> The inkjet recording apparatus according to the item <9>, wherein the inkjet recording apparatus is any one of a piezo inkjet recording apparatus and a thermal inkjet recording apparatus.

BEST MODE FOR CARRYING OUT THE INVENTION

A colorant dispersion for a recording ink according to the present invention contains a dispersant, a colorant, and water, and further contains other components as required.

The dispersant is a polycarboxylic acid dispersant containing units represented by formulae (1) to (3). When all these units are provided in a dispersant, the dispersant contributes to exhibit a significant effect on the storage stability of the colorant dispersant and ink liquid, and to provide a high image density to images formed with the ink liquid containing the colorant dispersion.

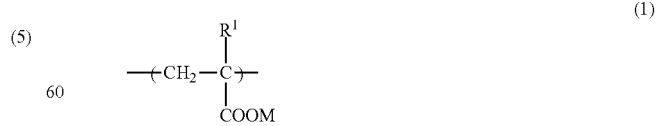

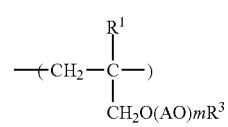

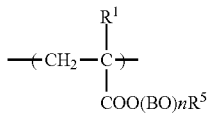
(3)

In the formulae (1) to (3), $R^1$, $R^2$, and $R^4$ are selected from a hydrogen atom and $CH_3$; $R^3$ is selected from a hydrogen atom and a C1-C3 alkyl group; $R^5$ represents a C1-C3 alkyl group; AO and BO represent a C2-C3 oxyalkylene group; M is selected from alkali metal, alkali earth metal, ammonium, and organic amine; m represents an integer of 1 to 30; and n represents an integer of 5 to 50.

When the dispersant further contains a unit(s) represented by formula (4) and/or formula (5), the image density becomes more excellent.

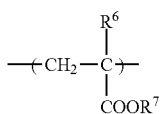
(4)

In the formula (4), $R^6$ is selected from a hydrogen atom and $CH_3$; and $R^7$ represents a C1-C3 alkyl group.

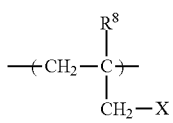
(5)

In the formula (5), $R^8$ is selected from a hydrogen atom and $CH_3$; and X is selected from formulae (5)-1 and (5)-2:

(5)-1 where M is selected from alkali metal, alkali earth metal, ammonium, and organic amine;

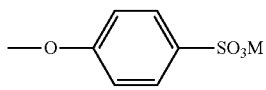
(5)-2 where M is selected from alkali metal, alkali earth metal, ammonium, and organic amine.

On the other hand, a dispersant containing units of formulae (1) and (3) but not a unit of formula (2), or a dispersant containing units of formulae (1) and (2) but not a unit of formula (3) is less effective in forming images of high image density.

It is an important that the unit represented by formula (1) is a salt. Otherwise the unit may lead to poor dispersibility of the colorant in water because of poor compatibility of the unit with water and to poor liquid stability of an ink with time when the ink has been formed with the colorant dispersion. Furthermore, when the unit represented by formula (1) is not a salt, the resulting dispersant becomes less effective in forming images of high image density.

In order to synthesize the unit of formula (1) as a salt, a monomer of a salt of acrylic acid may be used, or after a polycarboxylic acid dispersant has been produced by copolymerizing non-salt monomers for units (1) to (3) the polycarboxylic acid dispersant may be neutralized with a base to finally prepare a polycarboxylic acid dispersant having the unit of formula (1) as a salt. Alternatively, both of the above processes are used in combination to produce the unit of formula (1) as a salt.

In formula (2), $R^3$ is selected from H (hydrogen atom) and a C1-C3 alkyl group, however, using a hydrogen atom is preferred to using a C1-C3 alkyl group in terms of improving an image density.

In formula (3), $R^5$ needs to be a C1-C3 alkyl group. If $R^5$ is a hydrogen atom, the resulting dispersant becomes less effective in forming a high image density.

In addition, when a dispersant disclosed in the present invention is used for dispersing a colorant under alkaline conditions, not only dispersibility of the colorant is improved but also a resulting image density becomes excellent.

A monomer for the unit of formula (1) is, for example, as shown as formula (6):

$$CH_2 = \underset{\underset{COOM}{|}}{\overset{\overset{R^1}{|}}{C}}$$
(6)

In the formula (6), $R^1$ is selected from H and $CH_3$; M is selected from H, alkali metal, alkali earth metal, ammonium, and organic amine; and provided that, when M is H, after a polycarboxylic acid dispersant has been produced by copolymerizing this monomer with the other monomers, the polycarboxylic acid dispersant needs to be neutralized with a base to change the carboxylic acid moieties to moieties of a salt of carboxylic acid.

Examples of the formula (6) include (meth)acrylic acid or a salt thereof. Examples of the salt include salts of: an alkali metal such as lithium, sodium, and potassium; an alkali earth metal such as calcium, and magnesium; ammonium; and an organic amine, for example: aliphatic amines produced by substituting one or more hydrogen atom(s) of ammonia with alkyl group(s), such as mono-, di-, and trimethylamine, and mono-, di-, and triethylamine; alcohol amines produced by substituting one or more hydrogen atom(s) of ammonia with alcohol group(s), such as monoethanolamine, diethanolamine, triethanolamine, methylethanolamine, methyldiethanolamine, dimethylethanolamine, choline, aminoethanepropanediol, monopropanolamine, dipropanolamine, tripropanolamine, isopropanolamine, trishydroxymethylaminomethane, aminoethylpropanediol; and cyclic amines such as morpholine, N-methylmorpholine, N-methyl-2-pyrrolidone, and 2-pyrrolidone.

Among these salts, salts of an alkali metal such as lithium, sodium, and potassium, and salts of an alcohol amine such as diethanolamine and triethanolamine are preferred in terms of dispersion stability.

A monomer for the unit of formula (2) is, for example, as shown as formula (7):

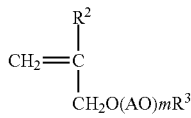

(7)

In the formula (7), $R^2$ is selected from H and $CH_3$; $R^3$ is selected from H and a C1-C3 alkyl group; AO represents a C2-C3 oxyalkylene group; and m represents an integer of 1 to 30.

Preferably $R^3$ is a hydrogen atom in terms of improving an image density.

The polyoxyalkylene group may be formed by polymerizing or copolymerizing ethylene oxide and/or propylene oxide.

The polyoxyalkylene group is preferably a polyethylene oxide group, which is the most effective in improving an image density.

M is an integer of 1 to 30, and preferably an integer of 4 to 25. When m is one or more, the resulting dispersant becomes more effective in increasing an image density. When m is 30 or less, the resulting dispersant tends to improve dispersibility. Especially when m is 4 to 25, the effects of the resulting dispersant are pronounced.

Examples of formula (7) include polyalkyleneglycol mono(meth)allyl ethers and alkoxypolyalkyleneglycol mono(meth)allyl ethers. Among the latter ethers, methoxypolyalkyleneglycol mono(meth)allyl ethers are preferred.

A monomer for the unit of formula (3) is, for example, as shown as formula (8):

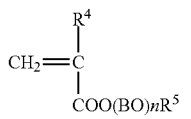

(8)

In the formula (8), $R^4$ is selected from H and $CH_3$; $R^5$ represents a C1-C3 alkyl group; BO represents a C2-C3 oxyalkylene group; and n represents an integer of 5 to 50.

The polyoxyalkylene group may be formed by polymerizing or copolymerizing ethylene oxide and/or propylene oxide.

The polyoxyalkylene group is preferably a polyethylene oxide group, which is the most effective in improving an image density.

"n" is an integer of 5 to 50, and preferably an integer of 8 to 35. When n is 4 or more, the resulting dispersant becomes more effective in increasing an image density. When n is more than 50, however, the solubility of the resulting dispersant in water becomes poor, and it becomes difficult to use the dispersant as an aqueous dispersant. Especially when n is 8 to 35, the effect of resulting dispersant in increasing an image density is excellent.

Examples of formula (8) include alkoxypolyalkyleneglycol mono(meth)acrylates. Specific preferred examples thereof include methoxypolyethyleneglycol mono(meth)acrylates, ethoxypolyethyleneglycol mono(meth)acrylates, propoxypolyethylene glycol mono(meth)acrylates, and isopropoxypolyethyleneglycol mono(meth)acrylates. Among them, methoxypolyethyleneglycol mono(meth)acryltes are particularly preferred.

A monomer for the unit of formula (4) is, for example, as shown as formula (9):

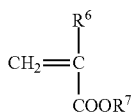

(9)

In the formula (9), $R^6$ is selected from H and $CH_3$; and $R^7$ represents a C1-C3 alkyl group.

Examples of formula (9) include esters of (meth)acrylic acid such as methyl (meth)acrylate, ethyl (meth)acrylate, propyl (meth)acrylate, and isopropyl (meth)acrylate.

A monomer for the unit of formula (5) is, for example, as shown as formula (10):

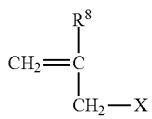

(10)

In the formula (10), $R^8$ is selected from H and $CH_3$; and X is selected from formula (10)-1 and formula (10)-2:

(10)-1 where M is selected from H, alkali metal, alkali earth metal, ammonium, and organic amine; and provided that, when M is H, after a polycarboxylic acid dispersant has been produced by copolymerizing this monomer with the other monomers, the polycarboxylic acid dispersant needs to be neutralized with a base to change the sulfonic acid moieties to moieties of a salt of sulfonic acid;

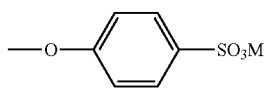

(10)-2 where M is selected from H, alkali metal, alkali earth metal, ammonium, and organic amine; and provided that, when M is H, after a polycarboxylic acid dispersant is produced by copolymerizing this monomer with the other monomers, the polycarboxylic acid dispersant needs to be neutralized with a base to change the sulfonic acid moieties to moieties of a salt of sulfonic acid.

Examples of formula (10) include methallylsulfonic acid, p-methallyloxybenzenesulfonic acid or a salt thereof. Examples of the salt include salts of: an alkali metal such as lithium, sodium, and potassium; an alkali earth metal such as calcium, and magnesium; ammonium; and an organic amine, for example: aliphatic amines produced by substituting one or more hydrogen atom(s) of ammonia with alkyl group(s), such as mono-, di-, and trimethylamine, and mono-, di-, and triethylamine; alcohol amines produced by substituting one or more hydrogen atom(s) of ammonia with alcohol group(s), such as monoethanolamine, diethanolamine, triethanolamine, methylethanolamine, methyldiethanolamine, dimethylethanolamine, choline, aminoethanepropanediol, monopropanolamine, dipropanolamine, tripropanolamine, isopropanolamine, trishydroxymethylaminomethane, aminoethylpropanediol; and cyclic amines such as morpholine, N-methylmorpholine, N-methyl-2-pyrrolidone, and 2-pyrrolidone.

Among these salts, salts of an alkali metal such as lithium, sodium, and potassium, and salts of an alcohol amine such as diethanolamine and triethanolamine are preferred in terms of dispersion stability.

The polycarboxylic acid dispersant according to the present invention is produced by copolymerizing monomers of formula (6), formula (7), and formula (8). Here, monomers of formulas (6) to (8) may be used alone or in combination, respectively.

Furthermore, when a colorant dispersion has been prepared by using a polycarboxylic acid dispersant produced by copolymerizing, in addition to the above-mentioned monomers, monomers of formula (9) and/or formula (10) each with one or more type(s), it can produce an image density more excellent than an image density obtained with an ink containing a colorant dispersion using a polydcarboxylic acid dispersant produced by copolymerizing only the above-mentioned monomers.

A compounding ratio (mole %) of the monomers of formulae (6) to (10) is preferably as follows, 45-65:3-25:5-25: 0-15:8-23 (=formula (6)=formula (7) formula (8) formula (9) formula (10)).

The polycarboxylic acid dispersant preferably has a number average molecular weight in the range of 2,000 to 20,000 (as measured by a GPC method using a pullulan standard).

A dispersant which can be used in the present invention can be prepared by a synthetic process, however, also is commercially available as CHUPOL series polycarboxylic acid dispersant produced by TAKEMOTO OIL & FAT Co., Ltd.

A method for copolymerizing is not particularly limited as long as the resulting dispersant is not functionally impaired, and may be selected from known methods, for example, a method disclosed in Japanese Patent No. 2646449.

An example of the synthetic method will be described below for reference.

Above-mentioned monomers are subjected to a radical copolymerization reaction in the presence of a radical initiator so as to prepare a radical copolymer with a predetermined ratio of the monomers. It is important that the copolymerization reaction should be initiated in an aqueous solution using water or a solvent mixture of water and water-soluble organic solvent.

Specifically, first, each monomer is dissolved in water, and an aqueous solution containing the monomers in a total concentration of 10 mole % to 45 mole % is prepared. Next, a radical initiator is added into the aqueous solution under a nitrogen gas atmosphere to initiate a radical copolymerization reaction at a temperature of 50° C. to 70° C. for 5 hr to 8 hr. Thereby a polycarboxylic acid dispersant (water-soluble vinyl copolymer) is obtained. The type of the radical initiator is not particularly limited, as long as it is decomposed at a copolymerization reaction temperature to produce radicals, and is preferably a water-soluble radical initiator. Examples of the water soluble radical initiator include potassium persulfate, ammonium persulfate, hydrogen peroxide, and 2,2-azobis(2-amidinopropane) dihydrochloride. These can be combined with a reducing substance such as a sulfite salt and L-ascorbic acid and further with an amine, etc. to serve also as a redox initiator for use.

The pH (hydrogen-ion exponent) of a colorant dispersion may be neutral (7.0±0.5), however, is preferably alkaline at pH 8 to pH 12, and preferably at pH 9 to pH 11 in terms of improving dispersibility and of increasing an image density (see Examples 3 and 13). When the pH is excessively low, drying property/image density tends to fall. When the pH is more than 11, drying property/image density again tends to fall, because base components are increased in amount and as a result remain in an image. The pH can be measured by a pH meter using a glass electrode method.

In order to control the pH to fall within the above range, a pH adjuster is preferably used. The amount of the pH adjuster cannot be specifically specified as it differs depending on the materials contained in the colorant dispersion. However, the amount of pH adjuster may be adjusted suitably such that the pH of the colorant dispersion as measured by a pH meter falls within the above range.

The pH adjuster may be any substance as long as it is basic, and is, for example, ammonia; an alcohol amine such as triethanolamine, tripropanolamine, diethanolamine, and monoethanolamine; an alkali metal hydroxide such as lithium hydroxide, potassium hydroxide, and sodium hydroxide; an acid ammonium salt such as ammonium sulfate, and ammonium tartrate; an ammonium salt such as a quaternary alkyl ammonium hydroxide; a phosphonium hydroxide; or a mixture thereof.

The type of a colorant of the present invention is not particularly limited, and may be selected from an inorganic colorant and an organic colorant.

When the colorant is used in a recording ink, the colorant is preferably selected from a pigment in terms of preventing color fading due to exposure to light and of solubility in water.

Examples of a preferred pigment for inkjet application are as follows. Examples of a black pigment preferably include a carbon black such as ketjen black, furnace black, acetylene black, thermal black, and gas black. Furthermore, carbon blacks surfaces of which are treated with an acid or an alkali, surfaces of which are coated with a surfactant of various kinds or with a resin, or on which some group is grafted, or which are encapsulated, may be used.

Particularly when acid carbons which are produced by treating surfaces of a carbon black with an acid and show acidity are used, drying property as well as an image density are significantly improved. Furthermore also when carbon blacks which are produced by coating surfaces thereof with a resin having a sulfonic acid group or a carboxy group or by grafting a sulfonic acid group or a carboxy group therein are used, the drying property as well as an image density are again significantly improved.

Particularly when the colorant is a material having a large specific surface area such as carbon black, dispersion stability or effects on a high image density become more excellent in the colorant dispersion using the dispersant according to the present invention than in a colorant dispersion using other dispersant.

Specific examples of the acid carbon include MA7, MA8, MA100, MA600, #45, #50, #2200B, #2350, #2650, OIL 7B, and OIL 11B (all manufactured by Mitsubishi Chemical Corporation); RAVEN 1035, RAVEN 1040, RAVEN 1060, RAVEN 1080, RAVEN 1255, RAVEN 3500, and RAVEN C (all manufactured by Columbia Carbon, Inc.); REGAL 400R, and MOGUL L (all manufactured by Cabot Corporation); Color Black FW1, Color Black FW18, Color Black S150, Color Black S160, Color Black S170, Printex U, Printex V, Printex 75, Printex 140U, Printex 140V, Special Black 4, Special Black 100, Special Black 250, Special Black 350, NIPEX 150, and NIPEX 180IQ (all manufactured by Degussa Inc.).

Among these, particularly carbon blacks having pH values of 5 or less and containing volatile components in ratios of 3.5% by mass to 8.0% by mass are preferably used, and gas blacks are preferred in terms of drying property and an image density.

Examples of a magenta pigment include Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Examples of a cyan pigment include Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Bat Blue 4, and Bat Blue 60.

Examples of a yellow pigment include Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

When Pigment Yellow 74 for the yellow pigment, Pigment Red 122 and Pigment Violet 19 for the magenta pigment, and Pigment Blue 15 for the cyan pigment are used, it is possible to obtain a well-balanced ink which is excellent in color tone and resistance to light.

The concentration of the pigments in the colorant dispersion is preferably 0.1% by mass to 50% by mass, and more preferably 0.1% by mass to 30% by mass.

Furthermore for the colorant used in the present invention, colorants produced by coating surfaces thereof with a surfactant such as a dispersant or with a resin, or by grafting some group therein or by encapsulating them are preferably used.

For the colorant dispersion of the present invention, other known dispersants may be used in combination.

As the known dispersant usable for this purpose, an anionic surfactant, an ampholytic surfactant, a cationic surfactant, and a nonionic surfactant may be appropriately used as required. Specific examples of these are as follows.

Examples of the anionic surfactant include alkylsulfocarboxylates, α-olefine sulfonates, polyoxyethylene alkyl ether acetates, N-acylamino acids and salts thereof, salts of N-acylmethyltaurines, alkyl sulfates, polyoxyalkyl ether sulfates, polyoxyethylenealkyl ether phosphates, citronellic acid soaps, salts of castor oil sulfate esters, salts of lauryl alcohol sulfate esters, alkylphenol type phosphate esters, naphthalenesulfonate formalin condensates, alkyl type phosphate esters, alkylallylsulfonates, diethylsulfosuccinates, and diethylhexylsulfosuccinate dioctylsulfosuccinates.

Examples of the cationic surfactant include 2-vinylpyridine derivatives and poly-4-vinylpyridine derivatives. Examples of the ampholytic surfactant include lauryl dimethyl amino acetic acid betaine, 2-alkyl-N-carboxymethyl-N-hydroxyethylimidazolinium betaines, coconut oil fatty acid amidopropyldimethylaminoacetic acid betaines, polyoctylpolyaminoethylglycine, or other imidazoline derivatives.

For the nonionic surfactant, the following compounds can be used: ethers such as polyoxyethylene nonylphenyl ethers, polyoxyethylene octylphenyl ethers, polyoxyethylene dodecylphenyl ethers, polyoxyethylene lauryl ethers, polyoxyethylene oleyl ethers, polyoxyethylene alkyl ethers, and polyoxyethylene dialkyl ethers; esters such as polyoxyethylene oleic acids, polyoxyethylene oleates, polyoxyethylene distearates, sorbitan laurate, sorbitan monostearate, sorbitan monooleate, sorbitan sesquioleate, polyoxyethylene monooleates, and polyoxyethylene stearates; and acetyleneglycols such as 2,4,7,9-tetramethyl-5-desine-4,7-diol, 3,6-dimethyl-4-octine-3,6-diol, and 3,5-dimethyl-1-hexine-3-ol.

When a carbon black has been selected for a colorant, the usable known dispersants are most preferably naphthalene sulfonate formalin condensates, an anionic surfactant. When the solid content of the carbon black is as high as 20% by mass or more, this dispersant is more effective than the other dispersants.

For a carbon black, carbon blacks having a BET surface area of $100 \ m^2/g$ to $400 \ m^2/g$ and a first-order particle diameter of 10 nm to 30 nm are particularly preferred in terms of a high density and stability of printed images.

The amount of a dispersant needs to be appropriately selected depending on the type of the colorant, and is preferably 0.005 parts by mass to 5 parts by mass for 1 part by mass of the colorant.

When a carbon black is used for a colorant, incorporating the dispersant in an amount of 0.01 parts by mass to 2 parts by mass for 1 part by mass of the colorant produces a homogenous colorant dispersion which has no problem in practice. When the amount of the dispersant is controlled to this range, dispersibility of the colorant is improved and stability with time of the colorant dispersion or a recording ink tends to improve. Particularly preferably, the amount of the dispersant is 0.02 parts by mass to 0.5 parts by mass for 1 part by mass of the colorant, which further improves stability with time of the colorant dispersion and the recording ink.

It is possible to incorporate an additive of various kinds other than water in the colorant dispersion of the present invention. Examples thereof include: water-soluble organic mediums; various surfactants such as a nonionic surfactant, anionic surfactant, cationic surfactant, and ampholytic surfactant; and antiseptic agents.

Examples of the water-soluble organic medium include alcohols such as methanol, ethanol, 1-propanol, and 2-propanol; polyhydric alcohols such as ethylene glycol, diethylene glycol, triethylene glycol, propylene glycol, and glycerine; pyrrolidone derivatives such as N-methylpyrrolidone and 2-pyrrolidone; ketones such as acetone and methylethylketone; and alkanolamines such as monoethanol amine, diethanol amine, and triethanol amine.

The colorant dispersion of the present invention using a carbon black can be obtained by dispersing the carbon black, a dispersant, water, and an additive of various kinds as required by means of a known dispersing machine such as sand mills, ball mills, roll mills, beads mills, nanomizers, homogenizers, and ultrasonic dispersion devices. For this process, preferably a "wet-type dispersion treatment" is employed. The "wet-type dispersion treatment" as used herein refers to a treatment of finely pulverizing and dispersing a mixture of the carbon black, the dispersant, water, and an water-soluble organic solvent as required by means of the above-mentioned known dispersing machine according to a so-called "wet-type dispersing method".

A colorant dispersion using a pigment as the colorant can be appropriately used particularly in a pigment inkjet ink.

The pigment inkjet ink is obtained by a known method, for example, a method in which a pigment dispersion, water, a water-soluble organic solvent, and a surfactant, etc. are mixed under stirring, coarse particles are filtered out by a filter or a centrifuge, etc., and the filtrate is deaerated as required. In addition, the amount of a carbon black in an ink is preferably 1% by mass to 20% by mass to the total weight of the ink. When the amount is less than 1% by mass, the printed images lack sharpness due to a low image density. When the amount is more than 20% by mass, the viscosity of the ink tends to increase, resulting in easy occurrence of nozzle clogging. Furthermore, materials similar to those described as additives for the pigment dispersion can be added into the ink as required.

For example, the amount of the water-soluble organic solvent is 50% by mass or less, preferably 5% by mass to 40% by mass, and more preferably 10% by mass to 35% by mass to the total amount of the ink.

A recording ink according to the present invention can be preferably used in an ink cartridge for housing the ink as described below. In addition, the recording ink according to the present invention can be used for image formation by applying the recording ink to an inkjet recording apparatus which ejects the recording ink onto a recording medium such as paper, as described below.

(Ink Cartridge)

An ink cartridge according to the present invention includes the recording ink of the present invention and a container configured to house the recording ink.

The container is not particularly limited and the shape, the structure, the size, the material, or the like of the container can be appropriately selected depending on the purpose; preferred examples of the container include containers having at least an ink bag which is formed with aluminum laminate film, resin film, or the like, and a plastic case.

The ink cartridge of the present invention houses the recording ink of the present invention and can be detachably mounted on various inkjet recording apparatuses. Further, it is particularly preferable that the inkjet cartridge be detachably mounted to an inkjet recording apparatus for use in the present invention described below.

(Inkjet Recording Apparatus and Inkjet Recording Method)

The inkjet recording apparatus of the present invention contains at least an ink jetting unit configured to jet the recording ink of the present invention by applying a stimulus to the recording ink to form an image, and further contains additional units as required.

An inkjet recording method of the present invention includes at least applying a stimulus to the recording ink of the present invention, ejecting the recording ink so as to record an image, and further includes additional steps as required.

Examples of the ink jetting unit include continuous injection ink jetting units and on-demand ink jetting units. Examples of the on-demand type ink jetting unit include ink jetting units using piezo-inkjet method, thermal-inkjet method, and electrostatic-inkjet method. Among these ink jetting units, those using a piezo-inkjet method and a thermal-inkjet method are particularly preferred.

The piezo-inkjet method is a method in which a diaphragm forming a wall surface of an ink flow passage is deformed by means of a piezoelectric element as a pressure generating unit configured to pressurize an ink flowing in the ink flow passage and change the ink volume in the ink flow passage, thereby ink droplets can be jetted (see Japanese Patent Application Laid-Open (JP-A) No. 02-51734).

The thermal-inkjet method is a method in which an ink is heated in an ink flow passage using a heat element or a resistive element to generate air bubbles therein, thereby ink droplets can be jetted (see Japanese Patent Application Laid-Open (JP-A) No. 61-59911).

The electrostatic-inkjet method is a method in which a diaphragm forming a wall surface of an ink flow passage is deformed by applying a static electricity generated in between the diaphragm and electrodes, where the diaphragm is disposed to face the electrodes, to change the ink volume in the ink flow passage, thereby ink droplets can be jetted (see Japanese Patent Application Laid Open (JP-A) No. 06-71882).

The stimulus can be generated, for example, by means of a stimulus generating unit. The stimulus is not particularly limited, may be appropriately selected depending on the purpose, and examples thereof include heat (temperature), pressure, vibration, and light. These stimuli may be used alone or in combination of two or more. Among these, heat and pressure are preferably used.

Examples of the stimulus generating unit include heaters, pressurizing devices, piezoelectric elements, vibration generators, ultra-sonic oscillators, and light. Specific examples of the stimulus generating unit include piezoelectric actuators such as piezoelectric elements; thermal actuators utilizing phase changes attributable to film boiling of a liquid by using an electric heat exchanger element such as exothermic resistor; shape-memorizing alloy actuators using metal phase changes attributable to temperature change; and electrostatic actuators using electrostatic force.

The aspect of the jetting of the recording ink is not particularly limited and differs depending on the type of the stimulus. For example, when the stimulus is heat, there is a method in which a heat energy in accordance with a recording signal is given to the recording ink in a recording head by using, for example, a thermal head to generate air bubbles in the recording ink by means of the effect of the heat energy and to thereby jet and spray the recording ink as droplets from a nozzle hole of the recording head by means of the effect of the pressure of the air bubbles. When the stimulus is pressure, for example, there is a method in which a voltage is applied to a piezoelectric element, which is bonded to the position called as a pressure chamber placed in an ink flow passage within a recording head, to make the piezoelectric element bend to shrink the inner volume of the pressure chamber and to thereby eject and spray the recording ink as droplets from a nozzle hole of the recording head.

An image formed matter is obtained on demand on a recording medium by recording an image on the recording medium using the inkjet recording apparatus of the present invention which houses the recording ink of the present invention. The recording ink can be replaced on an ink cartridge basis.

(Image Formed Matter)

An image formed matter of the present invention is composed of at least an image formed on a recording medium with the use of the recording ink according to the present invention.

The recording medium is not particularly limited and can be appropriately selected depending on the purpose; preferred examples thereof include a recording medium having ink absorbency such as paper, and a recording medium substantially lacking ink absorbency.

Examples of the recording medium include plastic sheets based on a material such as polyethylene terephthalate, polycarbonate, polypropylene, polyethylene, polysulfone, ABS resins, or polyvinyl chloride; recording media manufactured by coating with a metal a surface of a metal such as brass, iron, aluminum, SUS, or copper, or by coating with a metal a nonmetal base material, using a technique such as vapor deposition; recording media manufactured by subjecting paper as a base material to water-shedding treatment; and recording media composed of a so-called ceramic material manufactured by firing an inorganic material at a high temperature. Among these, paper is particularly preferred in terms of cost efficiency and naturalness of images produced thereon.

EXAMPLES

Hereinafter, the present invention will be further specifically described based on Examples; however, the present invention is not limited to these Examples, and those produced by appropriately modifying these Examples without departing from the scope of the present invention are included in the present invention.

Note that "m" or "n" of a polyethylene glycol material used as material B or C, respectively, represents a number of moles of ethylene oxide units polymerized by an addition reaction in each monomer. In addition in Examples, "part(s)" represents "part(s) by mass" for all the cases, and "%" represents "% by mass" except where "%" is used as a unit for a rate of change in viscosity.

Example 1

Dispersant P1, a pigment dispersion, and a recording ink were sequentially prepared according to the following procedures, and each of the pigment dispersion and the recording ink was evaluated.

<Preparation of Dispersant P1>

| | |
|---|---|
| A: methacrylic acid | 54 parts (0.628 mole) |
| B: polyethyleneglycol(m = 2) monoallyl ether | 14 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

The above materials were poured into a flask, and mutually dissolved under stirring.

Next, methacrylic acid was neutralized with 84 parts of a 30% aqueous solution of sodium hydroxide to adjust the pH of the reaction system to 8.5.

Subsequently, the air in the reaction system was replaced by nitrogen gas while the temperature of the reaction system was kept at 60° C. by a warm bath, then 30 parts of a 20% ammonium persulfate aqueous solution as a polymerization initiator was added into the reaction system to initiate a polymerization reaction for 4 hr, further 15 parts of a 20% ammonium persulfate aqueous solution was added to continue the polymerization reaction for additional 3 hr, and then the polymerization reaction was terminated.

Subsequently, 3 parts of a 30% sodium hydroxide aqueous solution was added for completely neutralizing acidic decomposed matter to prepare a product.

The product was condensed by an evaporator to remove unreacted monomers contained in the product thus obtained, further precipitated in a petroleum ether to filter out impurities, and then purified by vacuum desiccation to prepare a water-soluble vinyl copolymer (Dispersant P1).

<Preparation of Pigment Dispersion>

| | |
|---|---|
| Carbon black PRINTEX60 (a gas black produced by Degussa Inc, pH 10) | 20 parts |
| Dispersant P1 (10% aqueous solution) | 30 parts |
| Distilled water | 950 parts |

After the above materials had been premixed, the mixture was dispersed by a disk-type beads mill (KDL (of batch type) manufactured by Shinmaru Enterprises Corporation) using 0.3 mm zirconia beads at a peripheral speed of 10 m/s at a liquid temperature of 10° C. to an average particle diameter of ca. 120 nm, and then coarse particles were removed from the dispersion using a centrifuge machine (MODEL-3600, manufactured by KUBOTA Corporation) to prepare a pigment dispersion of Example 1. The pH value of this pigment dispersion was 6.8 as measured by a pH meter (MP20, manufactured by Mettler-Toledo International Inc.)

<Preparation of Ink>

Ink Formulation

| | |
|---|---|
| Pigment dispersion of Example 1 (pigment concentration: 20%) | 40.0 parts |
| Glycerin | 5 parts |
| 1,3-Butanediol | 15 parts |
| 2-Ethyl-1,3-hexanediol | 2.0 parts |
| Fluorine surfactant (solid content: 40%; ZONYL FS-300, manufactured by Du Pont Kabushiki Kaisha) | 2.5 parts |
| Self-emulsifying type polyurethane resin emulsion (W-5025, produced by Mitsui Chemicals Polyurethanes, Inc.; solid content: 30%; average particle diameter: 8.2 mm) | 0.6 part |

After the above materials were mixed and stirred for 30 min, the pH value of the mixture was adjusted to 8 with 2-amino-2-ethyl-1,3-propanediol, and further the mixture was diluted with distilled water to prepare an ink liquid of 170 parts.

Subsequently, coarse particles were removed from the ink liquid using a cellulose acetate filter (pore diameter: 5 μm; manufactured by SARTORIUS K.K.) to prepare a recording ink liquid.

The number of coarse particles having a particle size of 5 μm or more was 500 particles/1.2 ml as counted by ACCU-SIZER manufactured by Aglient Technologies, Inc.

Example 2

Dispersant P2 was produced in the same manner as in Example 1 except that the materials of Example 1 were changed to the following materials. Subsequently a pigment dispersion and an ink liquid were prepared using Dispersant P2 and evaluated.

| | |
|---|---|
| A: methacrylic acid | 54 parts (0.628 mole) |
| B: polyethyleneglycol(m = 4) monoallyl ether | 23 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 3

Dispersant P3 was Produced in the Same Manner as in Example 1 except that the materials of Example 1 were changed to the following materials. Subsequently, a pigment dispersion and an ink liquid were prepared using Dispersant P3 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 4

Dispersant P4 was produced in the same manner as in Example 1 except that the materials of Example 1 were changed to the following materials. Subsequently, a pigment dispersion and an ink liquid were prepared using Dispersant P4 and evaluated.

| | |
|---|---|
| A: methacrylic acid | 54 parts (0.628 mole) |
| B: polyethyleneglycol(m = 25) monoallyl ether | 113 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 5

Dispersant P5 was Produced in the Same Manner as in Example 1 except that the materials of Example 1 were changed to the following materials. Subsequently a pigment dispersion and an ink liquid were prepared using Dispersant P5 and evaluated.

| | |
|---|---|
| A: methacrylic acid | 54 parts (0.628 mole) |
| B: polyethyleneglycol(m = 28) monoallyl ether | 126 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 6

Dispersant P6 was produced in the same manner as in Example 1 except that the materials of Example 1 were changed to the following materials. Subsequently, a pigment dispersion and an ink liquid were prepared using Dispersant P6 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 4) monomethacrylate | 32 parts (0.120 mole) |
| D: methyl acrylate | 11 parts (0.128 mole) |
| F: ion-exchanged water | 260 parts |

Example 7

Dispersant P7 was produced in the same manner as in Example 1 except that the materials of Example 1 were changed to the following materials. Subsequently, a pigment dispersion and an ink liquid were prepared using Dispersant P7 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 8) monomethacrylate | 45 parts (0.120 mole) |
| D: methyl acrylate | 11 parts (0.128 mole) |
| F: ion-exchanged water | 260 parts |

Example 8

Dispersant P8 was produced in the same manner as in Example 1 except that the materials of Example 1 were changed to the following materials. Subsequently, a pigment dispersion and an ink liquid were prepared using Dispersant P8 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 35) monomethacrylate | 189 parts (0.120 mole) |
| D: methyl acrylate | 11 parts (0.128 mole) |
| F: ion-exchanged water | 260 parts |

Example 9

Dispersant P9 was Produced in the Same Manner as in Example 1 except that the materials of Example 1 were changed to the following materials. Subsequently, a pigment dispersion and an ink liquid were prepared using Dispersant P9 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 45) monomethacrylate | 239 parts (0.120 mole) |
| D: methyl acrylate | 11 parts (0.128 mole) |
| F: ion-exchanged water | 260 parts |

Example 10

Dispersant P10 was produced in the same manner as in Example 1 except that the materials of Example 1 were changed to the following materials. Subsequently, a pigment dispersion and an ink liquid were prepared using Dispersant P10 and evaluated.

| | |
|---|---|
| A: methacrylic acid | 54 parts (0.628 mole) |
| B: methoxypolyethyleneglycol(m = 8) monoallyl ether | 42 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 11

Dispersant P11 was Produced in the Same Manner as in Example 1 except that the materials of Example 1 were changed to the following materials. Subsequently, a pigment dispersion and an ink liquid were prepared using Dispersant P11 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |

| E: sodium methallylsulfonate | 18 parts (0.114 mole) |
| F: ion-exchanged water | 260 parts |

Example 12

Dispersant P12 was produced in the same manner as in Example 1 except that the materials of Example 1 were changed to the following materials. Subsequently, a pigment dispersion and an ink liquid were prepared using Dispersant P12 and evaluated.

| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| E: sodium p-methallyloxybenzenesulfonate | 10 parts (0.04 mole) |
| F: ion-exchanged water | 260 parts |

Example 13

Dispersant P13 (the Same Dispersant as Dispersant 3) was produced in the same manner as in Example 1 except that the materials of Example 1 were changed to the following materials. Subsequently, a pigment dispersion and an ink liquid were prepared in the same manner as in Example 1 except that in preparing the pigment dispersion using Dispersant P13 the pH value of the mixture solution was adjusted to 8 with a 0.1 N sodium hydroxide aqueous solution and then the mixture solution was dispersed. Subsequently, the pigment dispersion and the ink liquid were evaluated.

| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 14

Dispersant P14 (the Same Dispersant as Dispersant P3) was produced in the same manner as in Example 1 except that the materials of Example 1 were changed to the following materials. Subsequently, a pigment dispersion and an ink liquid were prepared in the same manner as in Example 1 except that in preparing the pigment dispersion using Dispersant P14 the pH value of the mixture solution was adjusted to 11 with a 0.1 N sodium hydroxide aqueous solution and then the mixture solution was dispersed. Subsequently, the pigment dispersion and the ink liquid were evaluated.

| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 15

Dispersant P15 was produced in the same manner as in Example 1 except that the materials of Example 1 were changed to the following materials. Subsequently, a pigment dispersion and an ink liquid were prepared using Dispersant P15 and evaluated.

| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| F: ion-exchanged water | 260 parts |

Example 16

Dispersant P16 was produced in the same manner as in Example 1 except that the materials of Example 1 were changed to the following materials. Subsequently, a pigment dispersion and an ink liquid were prepared using Dispersant P16 and evaluated.

| A: acrylic acid | 45.2 parts (0.628 mole) |
| B: polyethyleneglycol(m = 8) methallyl ether | 41.4 parts (0.098 mole) |
| C: methoxypolyethyleneglycol(n = 23) monoacrylate | 126.4 parts (0.120 mole) |
| D: methyl methacrylate | 12.8 parts (0.128 mole) |
| F: ion-exchanged water | 260 parts |

Example 17

Dispersant P17 was produced in the same manner as in Example 1 except that the materials of Example 1 were changed to the following materials. Subsequently, a pigment dispersion and an ink liquid were prepared using Dispersant P17 and evaluated.

| A: acrylic acid | 45.2 parts (0.628 mole) |
| B: polyethyleneglycol(m = 8) methallyl ether | 41.4 parts (0.098 mole) |
| C: methoxypolyethyleneglycol(n = 23) monoacrylate | 126.4 parts (0.120 mole) |
| D: isopropyl acrylate | 14.6 parts (0.128 mole) |
| F: ion-exchanged water | 260 parts |

Example 18

Dispersant P18 was produced in the same manner as in Example 1 except that the materials of Example 1 were changed to the following materials. Subsequently, a pigment dispersion and an ink liquid were prepared using Dispersant P18 and evaluated.

| A: methacrylic acid | 54 parts (0.628 mole) |
| B: polyethyleneglycol(m = 8) monoallyl ether | 40 parts (0.098 mole) |
| C: ethoxypolyethyleneglycol(n = 23) monomethacrylate | 129.6 parts (0.120 mole) |
| D: methyl acrylate | 11 parts (0.128 mole) |
| F: ion-exchanged water | 260 parts |

Example 19

Dispersant P19 was produced in the same manner as in Example 1 except that the materials of Example 1 were changed to the following materials. Subsequently, a pigment dispersion and an ink liquid were prepared using Dispersant P19 and evaluated.

| | |
|---|---|
| A: methacrylic acid | 54 parts (0.628 mole) |
| B: polyethyleneglycol(m = 8) monoallyl ether | 40 parts (0.098 mole) |
| C: isopropoxypolyethyleneglycol(n = 23) monomethacrylate | 131.2 parts (0.120 mole) |
| D: methyl acrylate | 11 parts (0.128 mole) |
| F: ion-exchanged water | 260 parts |

Example 20

Dispersant P20 was produced in the same manner as in Example 1 except that the materials of Example 1 were changed to the following materials. Subsequently, a pigment dispersion and an ink liquid were prepared using Dispersant P20 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| E: sodium allylsulfonate | 16 parts (0.114 mole) |
| F: ion-exchanged water | 260 parts |

Example 21

Dispersant P21 was produced in the same manner as in Example 1 except that the materials of Example 1 were changed to the following materials. Subsequently, a pigment dispersion and an ink liquid were prepared using Dispersant P21 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| E: sodium allyloxybenzenesulfonate | 9.4 parts (0.04 mole) |
| F: ion-exchanged water | 260 parts |

Example 22

Dispersant P22 was produced in the same manner as in Example 1 except that the materials of Example 1 were changed to the following materials and that methacrylic acid was neutralized with 84 parts of a 28% calcium hydroxide suspension instead of 84 parts of a 30% sodium hydroxide solution of Example 1. Subsequently, a pigment dispersion and an ink liquid were prepared using Dispersant P22 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 23

Dispersant P23 was produced in the same manner as in Example 1 except that the materials of Example 1 were changed to the following materials and that methacrylic acid was neutralized with 84 parts of a 30% ammonia aqueous solution instead of 84 parts of a 30% sodium hydroxide solution of Example 1. Subsequently, a pigment dispersion and an ink liquid were prepared using Dispersant P23 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 24

Dispersant P24 was produced in the same manner as in Example 1 except that the materials of Example 1 were changed to the following materials and that methacrylic acid was neutralized with 300 parts of a 30% triethanolamine aqueous solution instead of 84 parts of a 30% sodium hydroxide solution of Example 1. Subsequently, a pigment dispersion and an ink liquid were prepared using Dispersant P24 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Example 25

Dispersant P25 was produced in the same manner as in Example 1 except that the materials of Example 1 were changed to the following materials. Subsequently, a pigment dispersion and an ink liquid were prepared using Dispersant P25 and evaluated.

| | |
|---|---|
| A: methacrylic acid | 54 parts (0.628 mole) |
| B: polyethyleneglycol(m = 1) monoallyl ether | 10 parts (0.098 mole) |
| C: methoxypolyethyleneglycol(n = 23) monomethacrylate | 128 parts (0.120 mole) |
| F: ion-exchanged water | 260 parts |

Example 26

Dispersant P26 was produced in the same manner as in Example 1 except that the materials of Example 1 were changed to the following materials. Subsequently, a pigment dispersion and an ink liquid were prepared using Dispersant P26 and evaluated.

| | |
|---|---|
| A: methacrylic acid | 54 parts (0.628 mole) |
| B: polyethyleneglycol(m = 30) monoallyl ether | 134 parts (0.098 mole) |
| C: methoxypolyethyleneglycol(n = 23) monomethacrylate | 128 parts (0.120 mole) |
| F: ion-exchanged water | 260 parts |

Example 27

Dispersant P27 was produced in the same manner as in Example 1 except that the materials of Example 1 were changed to the following materials. Subsequently, a pigment dispersion and an ink liquid were prepared using Dispersant P27 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 5) monomethacrylate | 52 parts (0.120 mole) |
| F: ion-exchanged water | 260 parts |

Example 28

Dispersant P28 was produced in the same manner as in Example 1 except that the materials of Example 1 were changed to the following materials. Subsequently, a pigment dispersion and an ink liquid were prepared using Dispersant P28 and evaluated.

| | |
|---|---|
| A: methacrylic acid | 54 parts (0.628 mole) |
| B: polyethyleneglycol(m = 8) monoallyl ether | 40 parts (0.098 mole) |
| C: methoxypolyethyleneglycol(n = 50) monomethacrylate | 265 parts (0.120 mole) |
| F: ion-exchanged water | 260 parts |

Comparative Example 1

Dispersant NP1 was produced in the same manner as in Example 1 except that the materials of Example 1 were changed to the following materials. Subsequently, a pigment dispersion and an ink liquid were prepared using Dispersant NP1 and evaluated. Note that in the following compound C $R^5$ is H, thus this compound C is not a compound defined by formula (8).

| | |
|---|---|
| A: methacrylic acid | 54 parts (0.628 mole) |
| B: polyethyleneglycol(m = 8) monoallyl ether | 40 parts (0.098 mole) |
| C: polyethyleneglycol(n = 23) monomethacrylate | 126 parts (0.120 mole) |
| D: methyl acrylate | 11 parts (0.128 mole) |
| F: ion-exchanged water | 260 parts |

Comparative Example 2

Dispersant NP2 was produced in the same manner as in Example 1 except that the materials of Example 1 were changed to the following materials. Subsequently, a pigment dispersion and an ink liquid were prepared using Dispersant NP2 and evaluated.

| | |
|---|---|
| A: methacrylic acid | 54 parts (0.628 mole) |
| C: methoxypolyethyleneglycol(n = 23) monomethacrylate | 128 parts (0.120 mole) |
| D: methyl acrylate | 11 parts (0.128 mole) |
| F: ion-exchanged water | 260 parts |

Comparative Example 3

Dispersant NP3 was produced in the same manner as in Example 1 except that the materials of Example 1 were changed to the following materials. Subsequently, a pigment dispersion and an ink liquid were prepared using Dispersant NP3 and evaluated.

| | |
|---|---|
| A: methacrylic acid | 54 parts (0.628 mole) |
| B: methoxypolyethyleneglycol(m = 8) monoallyl ether | 42 parts (0.098 mole) |
| D: methyl acrylate | 11 parts (0.128 mole) |
| F: ion-exchanged water | 260 parts |

Comparative Example 4

Dispersant NP4 was produced in the same manner as in Example 1 except that the materials of Example 1 were changed to the following materials. Subsequently, a pigment dispersion and an ink liquid were prepared using Dispersant NP4 and evaluated.

| | |
|---|---|
| A: methacrylic acid | 54 parts (0.628 mole) |
| B: polyethyleneglycol(m = 8) monoallyl ether | 40 parts (0.098 mole) |
| D: methyl acrylate | 11 parts (0.128 mole) |
| F: ion-exchanged water | 260 parts |

Comparative Example 5

Dispersant NP5 was produced in the same manner as in Example 1 except that the materials of Example 1 were changed to the following materials. Subsequently, a pigment dispersion and an ink liquid were prepared using Dispersant NP5 and evaluated.

| | |
|---|---|
| A: methacrylic acid | 54 parts (0.628 mole) |
| C: methoxypolyethyleneglycol(n = 23) monomethacrylate | 128 parts (0.120 mole) |
| D: methyl acrylate | 11 parts (0.128 mole) |
| E: sodium methallylsulfonate | 18 parts (0.114 mole) |
| F: ion-exchanged water | 260 parts |

Comparative Example 6

Dispersant NP6 was produced in the same manner as in Example 3 except that in preparing the dispersant methacrylic acid was not neutralized with 84 parts of a 30% sodium hydroxide aqueous solution (i.e. carboxylic acid moieties were not changed into their salt forms). Subsequently, a pigment dispersion and an ink liquid were prepared using Dispersant NP6 and evaluated.

<Evaluation>

Pigment dispersions and ink liquids of Examples 1 to 28 and Comparative Examples 1 to 6 were evaluated according to the following procedures.

The results are shown in Table 1-1, Table 1-2, Table 1-3, and Table 2.

(1) Storage Stability with Time (Liquid Storage Stability)

The initial viscosity of each of the pigment dispersions and ink liquids were measured. Next, 50 g of each liquid was placed and sealed in a sample pot (SV-50, manufactured by Nichiden Rika glass Co., Ltd.) and was stored for 2 weeks at 60° C. in the sample pot. Subsequently, the viscosity of the liquid in the sample pot was measured again to determine a rate of change in accordance with the following equation and the samples were ranked according to the rate. The viscosity was measured by a viscosity meter (RE500, manufactured by Toyo Seiki Seisaku-sho, LTD.)

Change rate(%)=[(viscosity of sample after two weeks of storage at 60° C.−initial viscosity)/initial viscosity]×100

A: Change rate is less than 10% (excellent)
B: Change rate is 10% to less than 15% (practically without causing problem)
C: Change rate is 15% to less than 20% (causing a problem)
D: Change rate is 20% or more (causing a problem)

(2) Image Density

An ink cassette of an inkjet printer (GX-5000, manufactured by Ricoh Company, Ltd.) was charged with each of the above ink liquids, a solid image was printed on a sheet of plain paper (PPC PAPER 4024, manufactured by Xerox Corporation), and the image density of the solid image was measured by X-RITE densitometer (the higher the value, the more excellent the image density is).

TABLE 1-1

| | Dispersant monomer (m and n are numbers of repeated units in polyoxyalkylene) | | | | | Dispersion | Liquid storage stability | | Image |
| | A | B | C | D | E | pH | Dispersion | Ink | density |
|---|---|---|---|---|---|---|---|---|---|
| Ex. 1 | Sodium methacrylate | Polyethyleneglycol(m = 2) monoallyl ether | Methoxypolyethyleneglycol (n = 23) monomethacrylate | Methyl acrylate | — | 6.8 | A | A | 1.18 |
| Ex. 2 | Sodium methacrylate | Polyethyleneglycol(m = 4) monoallyl ether | Methoxypolyethyleneglycol (n = 23) monomethacrylate | Methyl acrylate | — | 6.8 | A | A | 1.22 |
| Ex. 3 | Sodium methacrylate | Polyethyleneglycol(m = 8) monoallyl ether | Methoxypolyethyleneglycol (n = 23) monomethacrylate | Methyl acrylate | — | 6.8 | A | A | 1.26 |
| Ex. 4 | Sodium methacrylate | Polyethyleneglycol(m = 25) monoallyl ether | Methoxypolyethyleneglycol (n = 23) monomethacrylate | Methyl acrylate | — | 6.8 | A | A | 1.25 |
| Ex. 5 | Sodium methacrylate | Polyethyleneglycol(m = 28) monoallyl ether | Methoxypolyethyleneglycol (n = 23) monomethacrylate | Methyl acrylate | — | 6.8 | A | B | 1.17 |
| Ex. 6 | Sodium methacrylate | Polyethyleneglycol(m = 8) monoallyl ether | Methoxypolyethyleneglycol (n = 4) monomethacrylate | Methyl acrylate | — | 6.8 | A | A | 1.17 |
| Ex. 7 | Sodium methacrylate | Polyethyleneglycol(m = 8) monoallyl ether | Methoxypolyethyleneglycol (n = 8) monomethacrylate | Methyl acrylate | — | 6.8 | A | A | 1.26 |
| Ex. 8 | Sodium methacrylate | Polyethyleneglycol(m = 8) monoallyl ether | Methoxypolyethyleneglycol (n = 35) monomethacrylate | Methyl acrylate | — | 6.8 | A | A | 1.26 |
| Ex. 9 | Sodium methacrylate | Polyethyleneglycol(m = 8) monoallyl ether | Methoxypolyethyleneglycol (n = 45) monomethacrylate | Methyl acrylate | — | 6.8 | A | A | 1.18 |
| Ex. 10 | Sodium methacrylate | Methoxypolyethyleneglycol (m = 8) monoallyl ether | Methoxypolyethyleneglycol (n = 23) monomethacrylate | Methyl acrylate | — | 6.8 | A | B | 1.17 |
| Ex. 11 | Sodium methacrylate | Polyethyleneglycol(m = 8) monoallyl ether | Methoxypolyethyleneglycol (n = 23) monomethacrylate | Methyl acrylate | Sodium methallylsulfonate | 6.8 | A | A | 1.29 |
| Ex. 12 | Sodium methacrylate | Polyethyleneglycol(m = 8) monoallyl ether | Methoxypolyethyleneglycol (n = 23) monomethacrylate | Methyl acrylate | Sodium p-methallyl oxybenzenesulfonate | 6.8 | A | A | 1.30 |

TABLE 1-2

| | Dispersant monomer (m and n are numbers of repeated units in polyoxyalkylene) | | | | | Dispersion | Liquid storage stability | | Image |
| | A | B | C | D | E | pH | Dispersion | Ink | density |
|---|---|---|---|---|---|---|---|---|---|
| Ex. 13 | Sodium methacrylate | Polyethyleneglycol(m = 8) monoallyl ether | Methoxypolyethyleneglycol (n = 23) monomethacrylate | Methyl acrylate | — | 8 | A | A | 1.28 |
| Ex. 14 | Sodium methacrylate | Polyethyleneglycol(m = 8) monoallyl ether | Methoxypolyethyleneglycol (n = 23) monomethacrylate | Methyl acrylate | — | 11 | A | A | 1.28 |
| Ex. 15 | Sodium methacrylate | Polyethyleneglycol(m = 8) monoallyl ether | Methoxypolyethyleneglycol (n = 23) monomethacrylate | — | — | 6.8 | A | A | 1.24 |
| Ex. 16 | Sodium acrylate | Polyethyleneglycol(m = 8) methallyl ether | Methoxypolyethyleneglycol (n = 23) monoacrylate | Methyl methacrylate | — | 6.8 | A | A | 1.24 |

TABLE 1-2-continued

| | Dispersant monomer (m and n are numbers of repeated units in polyoxyalkylene) | | | | | Dispersion pH | Liquid storage stability | | Image density |
| --- | --- | --- | --- | --- | --- | --- | --- | --- | --- |
| | A | B | C | D | E | | Dispersion | Ink | |
| Ex. 17 | Sodium acrylate | Polyethyleneglycol(m = 8) methallyl ether | Methoxypolyethyleneglycol (n = 23) monoacrylate | Isopropyl acrylate | — | 6.8 | A | A | 1.24 |
| Ex. 18 | Sodium methacrylate | Polyethyleneglycol(m = 8) monoallyl ether | Ethoxypolyethyleneglycol (n = 23) monomethacrylate | Methyl acrylate | — | 6.8 | A | A | 1.24 |
| Ex. 19 | Sodium methacrylate | Polyethyleneglycol(m = 8) monoallyl ether | Isopropoxypolyethyleneglycol (n = 23) monomethacrylate | Methyl acrylate | — | 6.8 | A | A | 1.2 |
| Ex. 20 | Sodium methacrylate | Polyethyleneglycol(m = 8) monoallyl ether | Methoxypolyethyleneglycol (n = 23) monomethacrylate | Methyl acrylate | Sodium allyl-sulfonate | 6.8 | A | A | 1.28 |
| Ex. 21 | Sodium methacrylate | Polyethyleneglycol(m = 8) monoallyl ether | Methoxypolyethyleneglycol (n = 23) monomethacrylate | Methyl acrylate | Sodium allyloxy benzene sulfonate | 6.8 | A | A | 1.29 |

TABLE 1-3

| | Dispersant monomer (m and n are numbers of repeated units in polyoxyalkylene) | | | | | Dispersion pH | Liquid storage stability | | Image density |
| --- | --- | --- | --- | --- | --- | --- | --- | --- | --- |
| | A | B | C | D | E | | Dispersion | Ink | |
| Ex. 22 | Calcium methacrylate | Polyethyleneglycol(m = 8) monoallyl ether | Methoxypolyethyleneglycol (n = 23) monomethacrylate | Methyl acrylate | — | 6.8 | B | A | 1.25 |
| Ex. 23 | Ammonium methacrylate | Polyethyleneglycol(m = 8) monoallyl ether | Methoxypolyethyleneglycol (n = 23) monomethacrylate | Methyl acrylate | — | 6.8 | A | A | 1.24 |
| Ex. 24 | Triethanolamine methacrylate | Polyethyleneglycol(m = 8) monoallyl ether | Methoxypolyethyleneglycol (n = 23) monomethacrylate | Methyl acrylate | — | 6.8 | A | A | 1.26 |
| Ex. 25 | Sodium methacrylate | Polyethyleneglycol(m = 1) monoallyl ether | Methoxypolyethyleneglycol (n = 23) monomethacrylate | Methyl acrylate | — | 6.8 | A | A | 1.16 |
| Ex. 26 | Sodium methacrylate | Polyethyleneglycol(m = 30) monoallyl ether | Methoxypolyethyleneglycol (n = 23) monomethacrylate | Methyl acrylate | — | 6.8 | A | B | 1.16 |
| Ex. 27 | Sodium methacrylate | Polyethyleneglycol(m = 8) monoallyl ether | Methoxypolyethyleneglycol (n = 5) monomethacrylate | Methyl acrylate | — | 6.8 | A | A | 1.17 |
| Ex. 28 | Sodium methacrylate | Polyethyleneglycol(m = 8) monoallyl ether | Methoxypolyethyleneglycol (n = 50) monomethacrylate | Methyl acrylate | — | 6.8 | A | B | 1.15 |

TABLE 2

| | Dispersant monomer (m and n are numbers of repeated units in polyoxyalkylene) | | | | | Dispersion pH | Liquid storage stability | | Image density |
| --- | --- | --- | --- | --- | --- | --- | --- | --- | --- |
| | A | B | C | D | E | | Dispersion | Ink | |
| Comp. Ex. 1 | Sodium methacrylate | Polyethyleneglycol(m = 8) monoallyl ether | Polyethyleneglycol (n = 23) monomethacrylate | Methyl acrylate | — | 6.8 | B | C | 1.1 |
| Comp. Ex. 2 | Sodium methacrylate | — | Methoxypolyethyleneglycol (n = 23) monomethacrylate | Methyl acrylate | — | 6.8 | A | A | 1.09 |
| Comp. Ex. 3 | Sodium methacrylate | Methoxypolyethyleneglycol (m = 8) monoallyl ether | — | Methyl acrylate | — | 6.8 | A | A | 1.08 |
| Comp. Ex. 4 | Sodium methacrylate | Polyethyleneglycol(m = 8) monoallyl ether | — | Methyl acrylate | — | 6.8 | B | C | 1.10 |
| Comp. Ex. 5 | Sodium methacrylate | — | Methoxypolyethyleneglycol (n = 23) monomethacrylate | Methyl acrylate | Sodium methallylsulfonate | 6.8 | A | A | 1.10 |
| Comp. Ex. 6 | Methacrylic acid | Polyethyleneglycol(m = 8) monoallyl ether | Methoxypolyethyleneglycol (n = 23) monomethacrylate | Methyl acrylate | — | 6.8 | C | D | 1.04 |

INDUSTRIAL APPLICABILITY

Recording inks containing a dispersion of recording ink according to the present invention can be used in various recording processes using inkjet recording methods, for example, the recoding inks can be appropriately used in inkjet printers, facsimile apparatuses, and copiers.

The invention claimed is:

1. A colorant dispersion for a recording ink, the dispersion comprising:
a dispersant,
a colorant, and
water,
wherein the dispersant is a polycarboxylic acid dispersant comprising at least one unit represented by formula (1), at least one unit represented by formula (2), and at least one unit represented by formula (3):

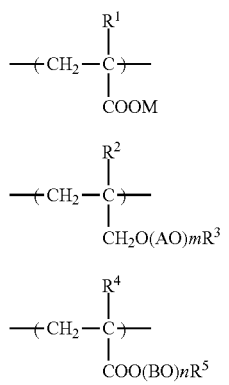

wherein:
$R^1$, $R^2$, and $R^4$ are selected from the group consisting of a hydrogen atom and $CH_3$;
$R^3$ is selected from the group consisting of a hydrogen atom and a C1-C3 alkyl group;
$R^5$ represents a C1-C3 alkyl group;
AO and BO represent a C2-C3 oxyalkylene group;
M is selected from the group consisting of an alkali metal, an alkali earth metal, ammonium, and an organic amine;
m represents an integer of 1 to 30; and
n represents an integer of 5 to 50.

2. The colorant dispersion according to claim 1, wherein the polycarboxylic acid dispersant further comprises a unit represented by formula (4):

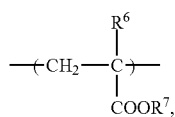

wherein:
$R^6$ is selected from the group consisting of a hydrogen atom and $CH_3$; and
$R^7$ represents a C1-C3 alkyl group.

3. The colorant dispersion according to claim 1, wherein the polycarboxylic acid dispersant further comprises a unit represented by formula (5):

wherein:
$R^8$ is selected from the group consisting of a hydrogen atom and $CH_3$; and
X is selected from the group consisting of a compound of formula (5)-1 and a compound of formula (5)-2:

wherein M is selected from the group consisting of an alkali metal, an alkali earth metal, ammonium, and an organic amine;

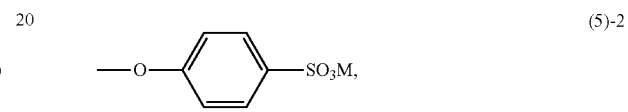

wherein M is selected from the group consisting of an alkali metal, an alkali earth metal, ammonium, and an organic amine.

4. The colorant dispersion according to claim 1, wherein the colorant is a carbon black.

5. A recording ink comprising:
a colorant dispersion for a recording ink,
wherein the colorant dispersion comprises:
a dispersant,
a colorant, and
water,
wherein the dispersant is a polycarboxylic acid dispersant comprising at least one unit represented by formula (1), at least one unit represented by formula (2), and at least one unit represented by formula (3):

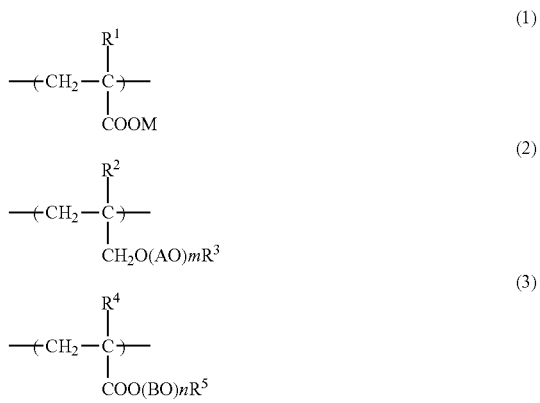

wherein:
$R^1$, $R^2$, and $R^4$ are selected from the group consisting of a hydrogen atom and $CH_2$;
$R^3$ is selected from the group consisting of a hydrogen atom and a C1-C3 alkyl group;
$R^5$ represents a C1-C3 alkyl group;
AO and BO represent a C2-C3 oxyalkylene group;
M is selected from the group consisting of an alkali metal, an alkali earth metal, ammonium, and an organic amine;

m represents an integer of 1 to 30; and n represents an integer of 5 to 50.

6. An ink cartridge comprising:

a recording ink, and a container configured to comprise the recording ink, wherein the recording ink comprises a colorant dispersion for a recording ink, and wherein the colorant dispersion comprises:

a dispersant, a colorant, and water, wherein the dispersant is a polycarboxylic acid dispersant comprising at least one unit represented by formula (1), at least one unit represented by formula (2) and at least one unit represented by formula (3):

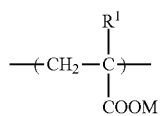
(1)

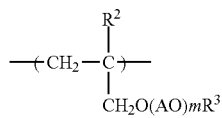
(2)

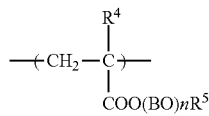
(3)

wherein:

$R^1$, $R^2$, and $R^4$ are selected from the group consisting of a hydrogen atom and $CH_3$;

$R^3$ is selected from the group consisting of a hydrogen atom and a C1-C3 alkyl group;

$R^5$ represents a C1-C3 alkyl group;

AO and BO represent a C2-C3 oxyalkylene group;

M is selected from the group consisting of an alkali metal, an alkali earth metal, ammonium, and an organic amine;

m represents an integer of 1 to 30; and n represents an integer of 5 to 50.

7. The colorant dispersion according to claim 2, wherein the polycarboxylic acid dispersant further comprises a unit represented by formula (5):

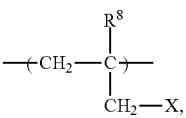
(5)

wherein:

$R^8$ is selected from the group consisting of a hydrogen atom and $CH_3$; and

X is selected from the group consisting of a compound of formula (5)-1 and a compound of formula (5)-2:

—$SO_3M$ (5)-1 wherein M is selected from the group consisting of an alkali metal, an alkali earth metal, ammonium, and an organic amine;

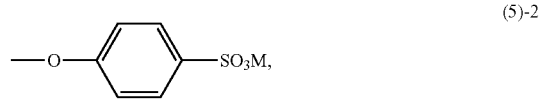
(5)-2 wherein M is selected from the group consisting of an alkali metal, an alkali earth metal, ammonium, and an organic amine.

8. The colorant dispersion according to claim 2, wherein the colorant is a carbon black.

9. The colorant dispersion according to claim 3, wherein the colorant is a carbon black.

10. The colorant dispersion according to claim 7, wherein the colorant is a carbon black.

11. The colorant dispersion according to claim 1, wherein n is an integer from 8 to 35.

12. The colorant dispersion according to claim 1, wherein m is an integer from 4 to 25.

* * * * *